United States Patent [19]

Davister et al.

[11] 4,298,583

[45] Nov. 3, 1981

[54] PROCESS FOR MANUFACTURING PHOSPHORIC ACID

[75] Inventors: Armand L. Davister, Liege, Belgium; Samuel V. Houghtaling, Lakeland, Fla.

[73] Assignee: Davy Powergas, Inc., Lakeland, Fla.

[21] Appl. No.: 852,614

[22] Filed: Nov. 18, 1977

[30] Foreign Application Priority Data

Nov. 4, 1977 [LU] Luxembourg .......................... 78457

[51] Int. Cl.³ .................... C01F 11/46; C01B 25/22
[52] U.S. Cl. .................................. 423/167; 423/320; 423/321 R
[58] Field of Search .................... 423/320, 319, 167

[56] References Cited

U.S. PATENT DOCUMENTS

| | | | |
|---|---|---|---|
| 2,699,985 | 1/1955 | Delruelle | 423/320 |
| 2,950,171 | 8/1960 | Macq | 23/285 |
| 3,181,931 | 5/1965 | Weber | 423/320 |
| 3,257,168 | 6/1966 | Chelminski | 423/320 |
| 3,416,889 | 12/1968 | Caldwell | 423/320 |
| 3,472,619 | 10/1969 | Chelminski et al. | 423/320 |
| 3,522,003 | 7/1970 | Lopker | 423/167 |
| 3,522,004 | 7/1970 | Lopker | 423/167 |
| 4,132,760 | 1/1979 | Ore et al. | 423/167 |
| 4,140,748 | 2/1979 | Ore | 423/167 |

*Primary Examiner*—Herbert T. Carter
*Attorney, Agent, or Firm*—Weiser, Stapler & Spivak

[57] ABSTRACT

A wet phosphoric acid production process comprising the attack on phosphate rock by sulfuric acid and phosphoric acid utilizing a vacuum cooling and a recirculation of the reaction slurry. The flow rates of the materials within the system are maintained at a level, relative to the rate of withdrawal of the slurry from the system, of between 300% and 4000% for the cyclic flow, between 2000% and 4000% for the vacuum cooling flow and between 500% and 2200% for the local agitation flow. Control of the flow rates according to factors including the rock analysis allows maximization of the yield of $H_3PO_4$.

22 Claims, 7 Drawing Figures

PROCESS FOR MANUFACTURING PHOSPHORIC ACID

This invention relates to process and apparatus for the manufacture of phosphoric acid by the so called wet process, i.e., the reaction of phosphate rock with sulfuric acid to produce phosphoric acid and precipitated calcium sulfate, followed by the separation of the latter by filtration and washing.

The reactions involved in such process are well known. In present practice, dry or wet ground phosphate rock is added to an already existing slurry of phosphoric acid and calcium sulfate crystals, and the phosphate rock is first mostly dissolved by part of the phosphoric acid contained in this slurry. Sulfuric acid, most generally in a concentrated form, is then mixed within the slurry, whereby further phosphoric acid is formed in the latter through the reaction of the dissolved phosphate with the increased concentration of $SO_4^{--}$ ions, and calcium sulfate is gradually crystallized, whereupon the latter is separated from the phosphoric acid by filtration and washing. The conditions of temperature and of phosphoric and sulfuric acid concentrations are, in most of the presently operating commercial plants, such that calcium sulfate crystallizes as gypsum $[CaSO_4.2(H_2O)]$.

In substantially all commercial processes, the reaction system is made up essentially of a continuous circulation of phosphoric slurry in closed circuit, which comprises a succession of portions or "reaction zones", each zone being the volume of slurry within the range of action of one or of a combined set of successive agitators distributed along the circuit, and the zones being either physically separated from each other (being separate reactors in series, or compartments of a reactor-block), or only constituted de facto by the establishment of a pattern of slurry streams, wherein each agitator or set of agitators is associated with a local slurry circulation, which is superimposed upon the general circulation through the successive zones. Every elementary fraction of slurry therefore passes in a determined succession through all of the various zones in accordance with the slurry streams, whether there be physical separations between the zones or not.

The reactants are introduced in the circuit at some specified points, and a part of slurry, containing the products at the production rate, is withdrawn from the circuit at another specified point, whereas the rest is indefinitely kept in circulation in the closed circuit.

In addition to this slurry circulation through the reaction system, a circulation of phosphoric acid is also provided through both filtration and part or whole of the reaction system, in order to keep the solid content of the slurry at a handlable or desired level. A portion of the mother liquor separated from the calcium sulfate at the filtration step is therefore mixed with the cake wash filtrates, and the mixture is recycled to the reaction system, the water rate in this recycle being adjusted so as to keep the target concentration of phosphoric acid in the slurry.

The purpose of the slurry circulation is firstly to introduce the reactants, i.e. phosphate rock, and sulfuric and dilute phosphoric acids into the reaction system in such a manner and conditions that they are dispersed and diluted within the circulating slurry, so as to avoid, in the same, excessive localized concentrations of reactants or dissolved phosphate rock, or excessive local temperature increases, caused by locally superactivated reactions, and secondly to provide, within the whole circuit, a large amount of sizeable seeds, for the calcium sulfate produced to crystallize thereupon, and so obtain final crystals of good filterability and washability.

In practice, the general circulation is produced by one or more circulating pumps recycling the slurry from a zone located downstream in the circuit, to another zone located upstream, and most generally, from the last downstream zone to the first upstream zone where phosphate rock is fed into the circuit.

On the other hand, the agitators are expected to produce a local stream of circulation within their respective zone, so that the slurry entering the zone from the previous one or the reactants added to the circuit through this zone are quickly dispersed in the slurry stream.

An important feature of the reactions from which phosphoric acid is drawn, is the large quantity of heat released, which has to be removed rather accurately in order to keep slurry temperature at a moderate level and within narrow limits, in order to match with the conditions necessary for the optimal crystallization of calcium sulfate.

The removal of reaction heat is typically accomplished by either of the two following methods and, in some instances, by a combination of both. In one method, air is blown into the slurry in the reaction system, whereby the heat is released mainly through water evaporation into the air blown. This method is now becoming obsolete, especially for the large sizes of plants now being installed, due chiefly to the high costs of investment, operation and maintenance involved by the necessary scrubbing of huge quantities of air, polluted with fluorine compounds, and also to serious difficulties in getting the outlet gases to comply with the atmospheric environment regulations.

In a second procedure, heat is removed by the cooling effect produced by partial vacuum adiabatic boiling off of the water included in the reaction mixture. Most usually, in the latter operation, a portion of the reaction slurry is pumped into an elevated vacuum chamber, wherein the required water boiling off occurs, caused by the reduced pressure, this accomplishing a so-called "flash cooling" of the slurry. The "flash cooler" is maintained at the vacuum value adequate to the cooling rate desired and the cooled slurry is returned to the reaction system, by way of a barometric leg or column of slurry which terminates beneath the liquid level in the receiving reaction zone.

For the last two decades, it has become customary that the flash cooler is positioned at a height such that the circulating liquid is freely falling within the cooler body, and that the whole of the general circulation of slurry through the reaction system is taken through the flash cooler, from downstream in the circuit, up to the head of the latter, whereinto phosphate rock is delivered. Slurry feed to the filtration and washing system is normally taken from a bleed on the cooled slurry discharged, and is often left to mature, before filtration, for some time, in one or several maturing tanks without general recirculation.

In connection with this, attention is brought to Delruelle U.S. Pat. No. 2,699,985 which also relates to phosphoric acid manufacture by the wet process. This patent shows a general slurry circulation connected to a maturing tank and where there are two flash coolers, one of which cools the circulating slurry in the reaction circuit proper, so keeping the reacting slurry at a temperature selected within the range of 140° to 175° F., whereas the second flash cooler brings the slurry bleed to the filter to a lower temperature, 105° to 125° F., so as to minimize the scaling in the filter circuit.

Actually, only the first flash cooler has been used in the commercial plants, and slurry feed to filter has been accepted within the range of 140° to 180° F., with a view to saving the additional cost of the second flash cooler installation.

Although the Delruelle Patent does not disclose any figure for the slurry flow recycled through both the reaction system and the flash cooler, it is known that the flow rate has usually been within the range of 10/1 to 15/1, where 1 is the basic flow of slurry which is produced by the reactants (including the recycled dilute phosphoric acid) and which also is fed to the filter system. With the knowledge of the $P_2O_5$ content in the product phosphoric acid and of the solid content selected for the slurry, which in practice is within the range of 30 to 40%, the flow figures, both basic flow and recirculated flow can be readily determined.

On the Delruelle Patent have been based quite a lot of commercial plants, spread out in the world, for phosphoric acid manufacture by the so-called "PRAYON PROCESS". Of particular interest are the large American plants set up from 1962 onwards, on the basis of the description and flow-sheet as published in the "Engineering and Mining Journal" of August 1963, pages 98 to 100, which for clarity's sake can be used as one of the conventional systems on which the particular features of the process according to the present invention can be grafted. On this flow-sheet can be seen a reaction block divided into 10 contiguous reaction zones or compartments, each zone fitted with one agitator, and an elevated flash cooler, which is fed with hot slurry through a submerged pump from the ninth zone, the cool slurry discharged into the tenth and last zone, being there divided in two streams, the so-called "basic flow" to the filter, and the rest recycled to the first zone, where phosphate rock is introduced.

The prior mixing of sulfuric acid with phosphate rock before their introduction into the slurry circuit, as shown in Delruelle Patent, had been abandoned, and replaced by the quick dispersion of phosphate rock alone into the head of slurry circuit in the first zone, whereas the other two reagents, sulfuric acid and recycled diluted phosphoric acid were then gradually introduced, each in one or all of the first four zones, at operator's discretion, in order to enable him to keep pace with the $SO_4^{--}$ ions consumption by the reactions.

Noteworthy also is the fact that the prior dilution and cooling of sulfuric acid of the Delruelle Patent has recently been cancelled.

No flow figures, either through the flash cooler, or recycled at the head of the circuit, are disclosed.

In accordance with the Delruelle Patent, it has been the practice of pumping substantial quantities of reaction slurry to relatively high levels through flash coolers with free slurry fall, at the cost of high power consumption, considerable pump maintenance and even, for some bad rocks, certain pumping problems.

On the other hand, as the heat removal cools the slurry, resulting in super-saturated solution, some precipitation of solids occurs. It has been found that if the slurry temperature is reduced by over about 9° F., excess precipitation may occur that, especially for certain rocks, will cause scale in the flash cooler body and barometric leg and produce very fine crystals of calcium sulfate due to increased nucleation, this affecting adversely the filterability and the washability of the calcium sulfate.

Due to the high pumping costs and large size of the pumps required, it has quite recently become customary, for large plants, to provide for the flash cooler only a fraction of the total general circulation flow of slurry, whereas the remaining fraction is recycled upstream directly by axial-flow circulating pumps against a low manometric head, and relatively low power consumption which contrasts with the high costs of pumping through the elevated vacuum flash cooler. This provision of direct recycling has enabled to increase to 20/1 the recirculation flow of the large plant described in Chemical Processing, February 1968, pages 10–12, wherein however no flash cooling zone is foreseen, the whole flow being recycled directly from the end to the head of the reaction circuit.

Other conventional systems on which the features of the present invention can be grafted are those displayed in SIAPE Belgian Pat. No. 738.747 (1968–1969), in Weber U.S. Pat. No. 3,181,931 (1962) or in MACQ U.S. Pat. No. 2,950,171 (1955), the reaction systems of these patents being completed with the vacuum cooling zone required for the present process.

In addition to temperatures, percentage of solids, concentration of acids and recirculation flow of the reaction slurry, other most important features, for getting reasonably complete reaction and good crystallization of calcium sulfate, are the "retention time" for the reacting slurry, which has most generally been chosen within the range of 4 to 8–10 or even 12 hours and the "travel-through time" which has however generally not been considered up to now. "Retention time" corresponds to the quotient of the reaction volume divided by the basic flow of slurry, whereas the "travel-through time" is the quotient of the same volume divided by the circulation flow of slurry.

Phosphoric acid having now developed to be one of the top mass industrial chemicals, manufactured and consumed in the world on large scale, drastic improvements in the cost of production have been, are, and still will be necessary and many plants will have to use new kinds of rocks which begin to be, or are preparing to come, on the world market, many of which are or will be of low grade and poor quality, in comparison to the rocks widely used up to now.

Extremely large sizes of plants have come on stream, still larger ones are being investigated and, in many directions, technological limitations have been stumbled upon, which cannot economically be put aside.

Those recent large plants generally involve the use of one or two well determined kinds of rock, with fixed operating parameters, which allow only a rather uneconomical treatment of some of the other usual phosphate rocks, and could not be used for satisfactory treatment of the new ones, the latter containing generally much more impurities which affect adversely their behaviour in the process.

Moreover, the heavy upwards shifting of the energy cost has been an imperative incentive to look for the possibilities for the treatment of coarsely ground rock, without, if possible, having to increase the retention time or equipment size in order to cope with the decreased "reactivity" connected with the coarser grind. It is indeed known that rock grinding energy is one important factor of phosphoric acid cost.

With the drastic uplift in phophate rock value, still more than in the past will it be necessary to be extremely careful about the efficiency of extraction, filtration and washing.

The recirculation of slurry, from the end of the reaction circuit to its head where phosphate rock is introduced, originates from Larsson U.S. Pat. No. 1,836,672 filed in 1931 (Reissue 19,045), which foresaw a recirculation rate between 2/1 and 4/1. In this patent, the phosphoric acid returned from the filtration system was also introduced at the head, whereas sulfuric acid and wash filtrates were added further downstream in the circuit.

Weber U.S. Pat. No. 2,049,032 filed in 1932 displays a slurry recirculation rate of 14.5/1, together with a premixing and prereaction of phosphate rock with recycled weak phosphoric acid from the filtration system in a wet grinding mill. Additionally, sulfuric acid is premixed within the recirculated slurry before the latter reaches the first reactor, where it is mixed with the phosphate rock-phosphoric acid mixture released from the grinding mill. An article of Weber in Chemical and Metallurgical Engineering, December 1932, pages 659–662 on the same process, discloses some figures from which the "retention" and "travel-through" times can be approximately calculated as 16 hours and 63 minutes respectively, being assumed that the recirculation rate is 14.5/1 as in the patent. It should further be noted that the filtration rate was very low: far less than the usual rates obtained by the processes of the present time.

All the plants applying the above mentioned processes, with moderate slurry recirculation rates, and rather long retention times, include equipment of large size, so requiring high investments, and, moreover, none of those plants has proved to be able to use with the required efficiency, all sorts of rocks, as existing or awaited on the market.

Attempts have been made to modify fundamentally the pattern and rate of slurry circulation and cooling in the reaction system, with the hope to reduce the size of plant equipment and the operating costs.

Lopker U.S. Pat. No. 3,522,003 displays a dual reactor system of very reduced size, comprising essentially a first vessel at atmospheric pressure wherein, in principle, phosphate rock is introduced, and a second vessel at a reduced pressure wherein sulfuric acid is sprayed onto the liquid surface, whilst vacuum evaporation effects the necessary cooling of the reacting mass. Essential features of the process are:

a small reaction volume corresponding to the typical retention time of 82 minutes of the example, a high recirculation rate, 57/1 for the example, and consequently very short travel-through time for the circulating slurry through the reaction system, 1 minute 20 seconds for the example, connected with the high recirculation rate are the small temperature drop and the small increments in the slurry claimed for the reactants added, i.e., 1.75% and 1%, but preferably 0.875% and 0.5%, respectively, for the $H_2SO_4$ and for the CaO of phosphate rock.

It must here be stressed that those increment limits have been currently used, although not claimed in figures, especially by the Prayon Plant arrangement shown in the flow-sheet of the "Engineering and Mining Journal" of August 1963.

Caldwell U.S. Pat. No. 3,416,889 displays an essentially monospace reaction system with a tremendously high circulation rate, preferably in the range of 300/1 to 700/1, all circulations, general, local and through the cooling zone being compounded together within this single high circulation, which entertains a substantially uniform composition and temperature in the slurry, despite the addition of reactants and the vacuum cooling, with retention times of the order of magnitude of 4 to 6 hours—this giving travel-through times of about 30 to 60 seconds.

These two processes, in spite of extensive experimental work at large industrial production scale did not get the good success, which the so attractive investment and operating costs displayed, should have forced for them.

In fact, one of their major disadvantages is apparently that they could not demonstrate that they could work satisfactorily, efficiently, safely and without problems, with the many kinds of phosphate rocks which have been available during the most recent years.

The absolute requirement to use new kinds of rocks, displaying very different behaviours, and, further, to use coarser ground rocks, has compelled to investigate in which way the conventional reaction circuits could be adapted to this necessary rock diversity.

Intensive research and experimental operation with a wide range of phosphate rock kinds has now shown that the existing wet phosphoric acid plants and processes including the new processes just mentioned, do not use the optimal circulation flows and patterns, either general, local in the zones or through the flash cooler, have very limited flexibility, so that optimal results cannot be reached, already for the usual rocks, and, also, new kinds of phosphate rocks now available cannot be treated economically either finely or coarsely ground in the said plants and processes.

The extensive industrial experimental work, conducted with a view to getting both reaction and filtration-washing optimal results, with the widest possible variety of phosphate rocks, and with coarse grinding as far as possible, has indeed surprisingly shown that when treating certain rocks, with high rates of general recirculation, not only is the completeness of reaction impaired, as some phosphates particles slip off the circuit when not yet completely consumed and are so fed to the filter, but also the filterability and washability of the gypsum is substantially reduced or severely affected. This fact is not in line with the general scientific teachings and technical knowledge that the best crystals and best filterability should be obtained with a high recirculation rate.

The conclusion of the research and experimental work has been, when a wide variety of rocks should be used, to foresee a general recirculation rate, adjustable generally between 3/1 and 40/1, the rate used depending on the particular rock treated.

As an example, it has been demonstrated, that, with a rock giving good results at a general recirculation rate of 5/1, an increase to 10/1, against every expectation, brought about a strong impairing of crystallization, from which ensued that it became impossible to get the whole production through the filter, and also the overall recovery of the plant was badly affected.

As to the circulation through the flash cooler, it has been found that for many rocks, the best rates are in the range of 30/1 to 40/1 which give results substantially better than the more moderate rates used previously whereas higher rates do not seem to bring any better result. For some other rocks, lower rates between 20/1 and 30/1 are sufficient, as higher ones do not bring any sensible improvement.

The experimental work has also shown that, for the rocks for which the reduction of the general recirculation flow to low levels, i.e. 3/1 to 10/1, for instance, has been found necessary, this reduction is not detrimental to a good crystallization, provided the internal circulation by at least some of the agitators in their respective zones is increased to ratios of 15/1 to 20/1, or more, instead of the low local rates commonly provided for.

According to the invention, it has been found that there exists a correlation between the nature of the rocks used and the optimal sets of circulation rates which enable to get the best recovery of $P_2O_5$ in the product phosphoric acid, and the best results in the filtration and washing of the gypsum coproduced.

It has been, indeed, possible to make a general classification of the various rocks, with the most appropriate sets of circulations for each class, account being taken of an optimally "coarse" grinding, i.e. such as 60 to 75% pass through a 100 mesh Tyler sieve, the particles bigger than 0.5 mm having been discarded and recycled to the grinding mills.

This classification shows that principally physical characteristics are involved, which may perhaps, in some cases, be tied up with certain chemical or composition characteristics.

A first class of phosphate rocks is that of the igneous apatites, which, although quite variable from some aspects, have the common feature to be known as the hardest and less reactive rocks. For this class, general recirculation should be low, 3/1 to 10/1. As to the circulation through the vacuum cooling zone, results are better at 25/1 than at 15/1, but beyond 30/1 no further sensible improvement is obtained: the choice will therefore be between 20/1 and 30/1 for this class. Chemical anaylses of those rocks can be globalized as follows: 37 to 40% $P_2O_5$; 50 to 53% CaO; 2 to 6% $SiO_2$; 0.4 to 0.6 MgO and less than 2% $CO_2$.

A second class, as opposed to apatites, includes the sedimentary phosphate rocks of North Africa, which are known to be the most reactive and the less hard rocks. For this second class, a "high" general recirculation of 30/1 to 40/1 is the most convenient. It is advantageous to be over 30/1 for the circulation through the vacuum cooling zone, but going over 40/1 appears to be unjustified: the range of 30/1 to 40/1 will therefore be chosen. Composition of the rocks of this second class are within the following limits: 29 to 34% $P_2O_5$; 48 to 51% CaO; 2 to 4% $SiO_2$; 0.2 to 0.6 MgO, and 4 to 6% $CO_2$.

In a third class can be gathered, in a general way, the sedimentary phosphate rocks of Central Florida, which are about half-way between the two previous classes, for reactivity as well as for hardness. For this third class, recirculation rates will range between 15/1 and 30/1, whereas the circulations through the vacuum cooling zones will be, as for the second class, between 30/1 and 40/1. Most of them are known for a high silica content, and also for a sensible contamination of iron and alumina oxides, this latter peculiarity seeming however to have no effect in relation with the circulation rates problem. Their analyses: 30 to 33% $P_2O_5$; 45 to 47% CaO, 7 to 11% $SiO_2$; 0 to 0.5% MgO and 1.5 to 3.5% $CO_2$.

As a detailed classification of the widely various sedimentary rocks of the new sources, of which the exploitation is now considered or has been initiated during the past few years does not appear practical nor necessary, they will be gathered in a fourth class, with general recirculation rates of 10/1 to 25/1, and circulations through the vacuum cooling zone of 20/1 to 40/1. Most generally, those rocks have demonstrated relatively low reactivities, and many contain characteristical rather hard particles, although not so hard as those of the first class. Their analysis generally ranges within the following limits: 28–31% $P_2O_5$; 44–48% CaO; 4–12% $SiO_2$; 0.5–1.2% MgO and 3–6% $CO_2$.

For the cases of low general recirculation rates, it has been found necessary to use, in the zones where reactants are introduced and in the zones which follow them immediately in the slurry circuit, local circulations by the respective agitators, the flows of which are such that the sum of local and general circulations is in any one of those specified zones at least equivalent to a rate of 25/1.

In all cases, one of the principles for the application of the present new teaching to have several different specified circulations, is that there must be at operator's disposal means of adapting the various circulations to suit the best requirements as found optimal for the specific phosphate rock used.

The present invention concerns essentially a process suitable for the manufacture of phosphoric acid by the so-called "wet process", having a succession of individualized reaction zones and which is able to treat economically, with only a coarse grinding, most of the various rocks known in the world, now on the market or considered to be used, and, more specifically to get therewith an efficient and smooth operation with a $P_2O_5$ recovery substantially the same or better than that which could be, up to now, achieved with the good usual rocks. The present invention further proposes specific means for applying the process involved.

More particularly, in the first instance, the process consists of a reaction system wherein, in addition to the local circulation in the reaction zones by the agitators, two separate slurry recirculation streams are featured, a first main one for a general circulation in closed circuit through the successive reaction zones, from the first zone where phosphate rock is fed into the slurry circuit throughout to the last zone where the slurry bleed is taken for supply to the filtration system, if desired through a series of maturing zones which are outside the circuit, said general circulation being recycled from the last zone to the first one, and a second one for a particular slurry circulation circuit grafted on the main one, through a part only of the reaction zones and through a vacuum cooling zone, the two circulation flows being independent from each other and subject to adjustment according to the recognized optimal requirement of each particular phosphate rock treated, account being taken also of the effect of the rock grind, the respective rates, based upon the rate of slurry continuously drawn off to be sent to filtration, at a flow rate defined as "basic slurry flow", being within the ranges of 3/1 to 40/1 for the general recirculation stream, 20/1 to 40/1 for the circulation through the vacuum cooling zone, and 5/1 to 22/1 for the local agitation streams.

The invention concerns, in the second instance, a particularly advantageous means for obtaining the huge stream which it requires through the flash cooling zone. This huge flow is obtained without the necessity of pumping the slurry to high levels, just by the connection of the vacuum cooling zone through two separate barometric legs, respectively, to two of the reaction zones wherebetween a slurry level differential is maintained of 1 to 5 feet, this being sufficient, together with the vacuum prevailing in the vacuum cooling zone, to keep the required flow moving from the higher level reaction zone to the lower one, through the vacuum cooling zone and the barometric legs.

The invention therefore concerns in this second instance, a reaction system comprising at least one vacuum cooling zone also referred to as "flash cooler" and several reaction zones at atmospheric pressure, of which at least two have different slurry levels, by which a high slurry circulation flow is maintained, without actual pumping, from one of the atmospheric zones with the high slurry level to another one with the low slurry level, through the vacuum cooling zone and the connecting barometric pipes.

The flash cooler has a sloping bottom towards its slurry outlet and barometric slurry discharge pipe, the lower end of the latter being submerged in the reaction zone or compartment with lower level, whereas its barometric slurry feed pipe, has its entry submerged in a reaction zone with the higher level, and its connection to the flash cooler body laterally in the bottom part of the latter.

Considering the degree of vacuum required in the cooler, which is coupled with the target temperature and strength of phosphoric acid therein, the liquid level in the flash cooler is maintained at a value appropriately intermediate between the respective top levels of the two barometric columns of slurry corresponding to the vacuum rate used, and taken from the two different levels in the atmospheric reaction zones system which are in connection with the flash cooler.

From this ensues that the circulation of slurry is maintained from the higher level atmospheric zone to the flash cooler, and from the latter to the lower level atmospheric zone, at the value tied up with the level differential maintained between the two atmospheric zones.

The flash cooler is located directly above and aside of the reaction zones involved in its circulation, with its bottom at a maximal height of about 12 feet above the lower liquid level of the reaction zones. Short and essentially vertical or heavily sloping pipes of very large size can be used without involving high cost, and this with low slurry velocity, low head loss, low friction wear, whereby a difference of level of about 1 to 5 feet in the reaction zones system is sufficient to provide the required huge circulation through the flash cooler. This enables to remove by vacuum cooling the reaction heat, whilst keeping the temperature drop through the flash cooler to a value well below the ones which have been the common practice up to now.

The level difference in the reaction zones system is maintained by one or several circulators which bring the cooled slurry back from the low level zone to the high level one. The total flow of these circulators settles the difference between the two levels and therefore also the flow through the cooler.

The two zones with respectively high and low slurry levels which are connected with the flash cooler, can, in principle, be located anywhere in the circuit, but the case will preferably be considered here wherein they are the last two zones of the circuit whereby the cooling of the slurry is produced at the end of the slurry closed circuit.

The cooled slurry recycling from the low level zone to the high level one can partly or wholly be made directly, in which case a corresponding stream of the circulators involved flows through the flash cooler and through the two zones only which are connected to it.

The recycling of the general slurry circulation is made by circulators, in principle from the last zone to the first one wherein introduction of phosphate rock into the circuit begins. When the last zone has a low slurry level, as in the case of FIG. 1 which will be described in detail further on, then the general circulation flows from the high slurry level zone into the flash cooler and thereafter into the downstream zone with the low level—and this flow is therefore a part of the whole circulation through the flash cooler, the balance of the latter corresponding to that other flow of the circulators which recycle directly the cool slurry upstreams from the low level zone to the high level one.

Figure 4:
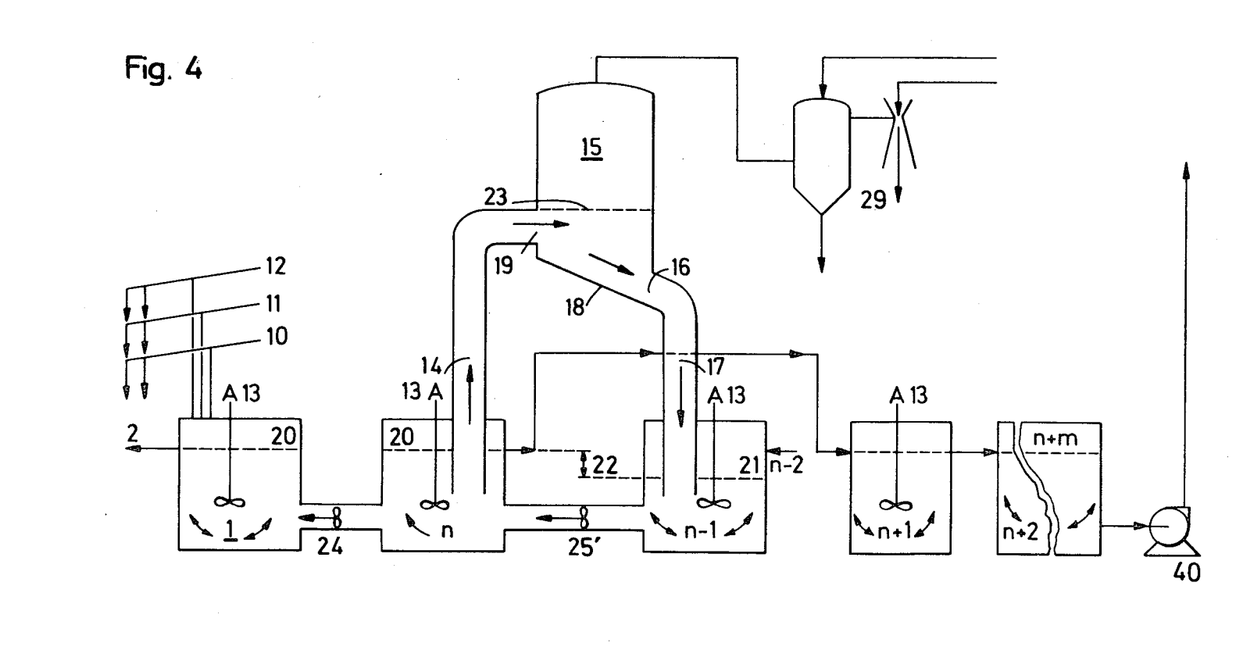
FIG. 4 is a schematic partial side elevation view of an alternative execution of the same reaction system with inverse circulation through the flash cooler.

If, on the contrary, as in the case of FIG. 4, the last zone has the high slurry level, then, the low level zone being upstream, the general circulation which is recycled, by the corresponding circulators, from the last to the first zone, does not flow through the flash cooler, wherein the circulation has the opposite direction, but it gets mixed with the cool slurry in the low slurry level zone, the whole mixture being then transferred by the second group of circulators downstreams to the high slurry level zone. In this particular case, the circulation through the flash cooler is the difference between the total flow of this second group of circulators and the general circulation flow.

Several possible slurry circuit patterns can thus be considered for the application of the present invention. Only two concrete cases will however be displayed in more details, in the examples which will follow, whilst other cases can be referred to this patent by analogy.

The flows through the circulators can be adjustable as required, and therefore the general circulation, and the circulation through the flash cooler can be regulated at their respective optimal value, depending on the phosphate rock processed.

The case will preferably be considered, wherein the atmospheric reaction zones which are not directly involved in the circulation through the flash cooler are substantially at the high slurry level, the slight gradual level fall tied up with the flow being neglected. Of course, other particular cases can be practiced, without impairing the validity of the invention.

The low motive heads required in the practice of the present invention make it unnecessary to use, for the "circulators" normal centrifugal or axial-flow pumps—although the latter may, of course, be employed. These motive heads can indeed be obtained by circulators or "pumps" of very simplified design or just by the action of propeller-type agitators suitably located in the reaction zones or in some appropriate ductwork in the circuit. This possibility much reduces the cost of the circulators and of their operation and maintenance.

The essential advantages of the new process, features and equipment arrangement described, are as follows:

All existing and prospective types of phosphate rocks can be used without fine grinding in such a plant, with the practically best completion of reaction and with production of calcium sulfate crystals of optimal size, corresponding to the best filtration and overall recoveries economically achievable;

Additionally to the power saving brought about by the flash cooler circulation without pumping, the large flow and the small temperature drop which become thus possible, correspond to a drastic decrease of the scaling in the flash cooler and in its barometric pipes- —and there is also avoided the formation in the cooled slurry of numerous unwanted small nuclei of gypsum, which could cause a reduction of the filtration rate and of the recovery;

Also not to neglect, are the savings in equipment, building, and operation costs of the plant brought about by the lower level of the flash cooler and by the simple circulators used.

The foregoing features and advantages of the present invention will become more apparent from the following description, made solely as examples, in conjunction with the drawings in which.

In the various figures, the same references are used for the same or similar elements.

Figures 1, 3:
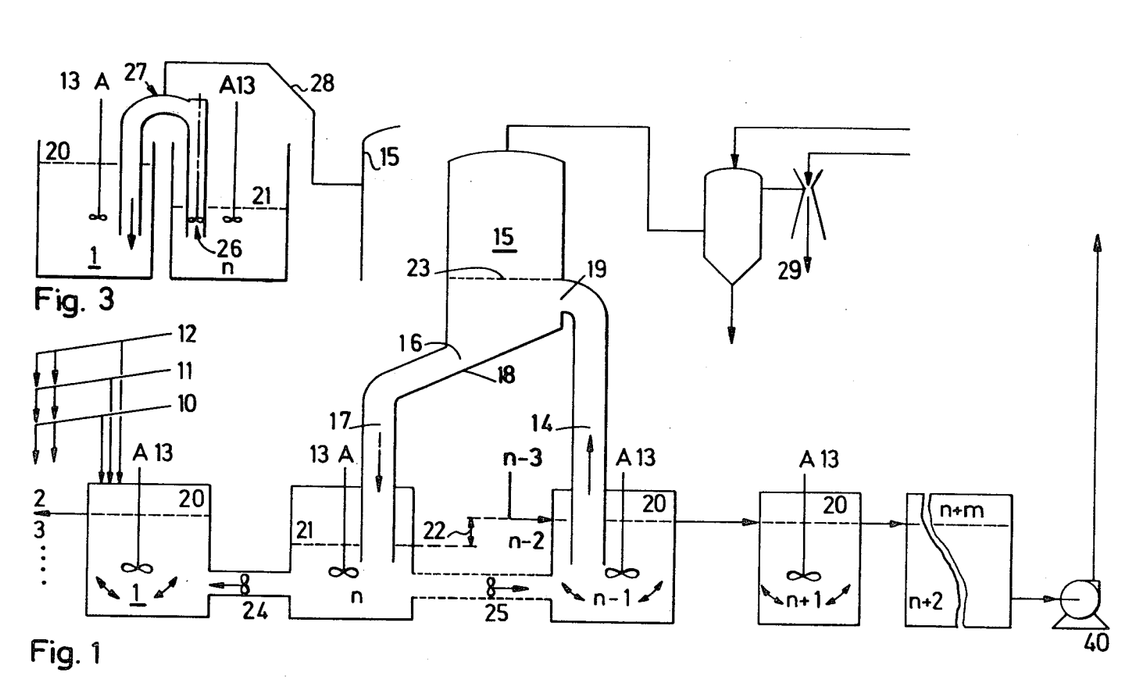
FIGS. 1 and 2 are respectively partial schematic elevation and plan views of a conventional, wet phosphoric acid reaction system, in accordance with the present invention.
FIG. 3 shows in elevation an alternative detail of the same reaction system.
Figure 2:
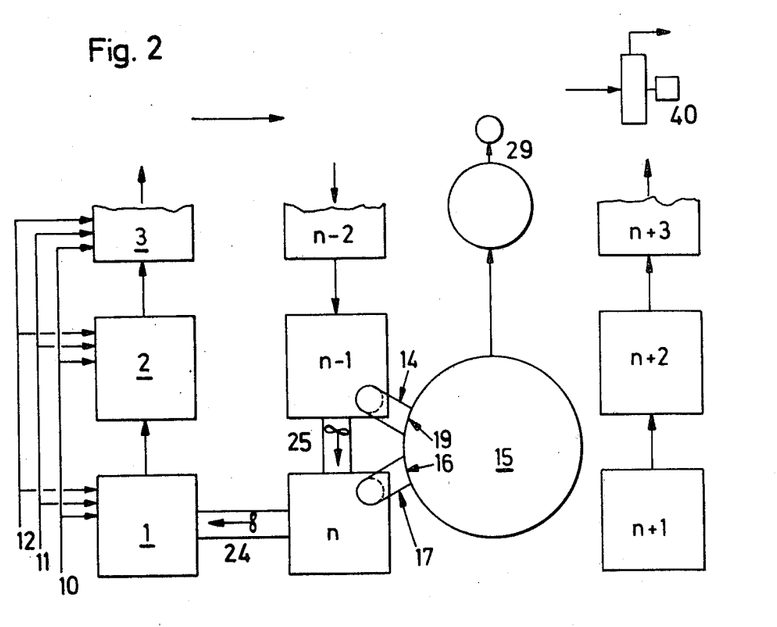

With reference to FIGS. 1 and 2 of the drawings, a typical reactor system used for a wet phosphoric acid process in accordance with the present invention is shown, which comprises essentially a closed circuit of slurry, made up of successive zones of reaction, which, for facility's sake, will be referred to hereinafter as "compartments". The slurry circuit has a number n of compartments working at atmospheric pressure, at least about 4 and up to about 12 or more. Additionally, when this is required by the quality of phosphate used, one or more compartments, (n+1, n+2, ... n+m), also at atmospheric pressure, may be provided for a slurry maturing outside the slurry circulation system of compartments 1 to n, and wherein the slurry, before being fed to the filtering and washing system, gradually looses some degrees of temperature and gets close to the crystallizing equilibrium, whereby, for a majority of rocks, scaling in the filter is substantially reduced.

In the system shown, phosphate rock is introduced through lines 10 to compartment 1, and, possibly, partly to 2 or 3 for certain particular rocks, whereas sulfuric acid and dilute phosphoric acid recycled from the calcium sulfate filtering and washing operation, are introduced through lines 11 and 12, both in portions into one or several of compartments 1, 2 and/or 3. Each of the compartments is provided with agitation means 13 and there is a general circulation of the slurry, maintained, according to the arrows, through the compartments in numerical order, from 1 to n, by circulators 24 which then recycle the slurry from n to 1.

The slurry to be cooled is drawn from compartment $n-1$, through barometric pipe 14 and fed to flash cooler 15, wherein a reduced pressure called "vacuum", is able to induce partial boiling off of the water contained in the slurry. After cooling, the slurry flows down by gravity through outlet 16 and barometric discharge pipe 17, into compartment n.

The foregoing name of "barometric" is intended to mean that the open lower ends of pipes 14 and 17 remain submerged within the liquids below slurry levels 20 and 21 of compartments $n-1$ and n respectively.

The bottom 18 of the flash cooler is sloped towards slurry outlet 16 to facilitate the flow of slurry therefrom and to avoid settling of solids in the flash cooler.

The flash cooler slurry outlet 16 is located at its lower point, whereas the slurry inlet 19 is at a substantially higher level, but still below the upper face of the barometric column of slurry, taken above liquid level 20 in compartment $n-1$, as it will be explained more in detail further on.

The circulation from $n-1$ to n, through flash cooler 15 and barometric pipes 14 and 17, is obtained by maintaining between compartments $n-1$ and n a level differential $22 = 20 - 21$, this differential resulting from the action of circulators 24, which recycle through compartments 1, 2, ... $n-1$, the general slurry circulation flow that they draw from n, coming upstream from 15 and $n-1$, this action being eventually coupled with that of circulators 25 which return directly from n to $n-1$ a slurry flow having followed through the flash cooler the direction of the general circulation.

The total circulation through the flash cooler is therefore the sum of the flows of circulators 24 (general circulation) and of circulators 25 (additional circulation through $n-1$, 15 and n only), and the level differential between $n-1$ and n, i.e. $22 = 20 - 21$, is automatically settled at the value that, with the help of the vacuum in 15, produces in the latter a total flow which equals the sum of the flows of all circulators 24 and 25.

In the case when the sole general circulation of circulators 24 is sufficient for the satisfactory operation of the flash cooler, the direct transfer from n to $n-1$ by circulators 25 can be stopped, which is indicated by the dotted line tracing.

Aside from the slight and progressive level fall along the gravity flow of the slurry, and also the small eventual overflows from any compartment to the following one, the liquid level 20 remains substantially the same in the compartments from 1 to $n-1$, the free liquid surfaces being at atmospheric pressure.

The "vacuum" of the desired amplitude is produced in the flash cooler by a set 29 of condenser-steam jet ejector, or condenser-vacuum pump, this amplitude being tied up with the heat quantity to be drawn off, and with the flow and composition of the slurry.

The slurry overcomes successively from $n-1$ into $n+1, n+2, \ldots, n+m$, from where a pump 40 delivers it, at the basic flow, to the filter, generally located at a high level and not shown in the figures.

Within the scope of the present invention process, the phosphate rocks presently known, either new or currently used, coarsely ground to a fineness of 60–75% through the 100 mesh Tyler Sieve—the particles larger than 0.5 mm having been discarded and recycled to the grinding—, call for a slurry temperature of 70°–80° C. at flash cooler inlet, with a circulation through the latter at a ratio between 20/1 and 40/1, which brings a temperature drop of 2° to 4° C. in the flash cooler. These figures correspond to absolute pressures in the flash cooler of 6" to 8" of Hg (0.20–0.27 Kg/cm$^2$ or 2.9–3.9 psi), or to a 1.6 density slurry barometric column of 17 to 15.5 feet.

The flow variation from 20/1 to 40/1 in the flash cooler will be covered by the variations from 1 to 5 feet of the slurry level differential 22, and, parallelly, the slurry level differential between the level in the flash cooler 23 and the "high" atmospheric level 20 will vary from about 0.6 to 3 feet as compared with the barometric column of slurry.

In accordance with those requirements, flash cooler will be positioned at a height such as the average slurry level 23 therein, approximately corresponding to the high point of slurry inlet 19, be at approx. 14.25 feet above the maximum operating level 20 of the slurry in the atmospheric reaction zones, the latter level being assumed to drop by about 1 foot in case of an 8" Hg vacuum with a slurry flow rate of 20/1.

The equipment installation will therefore be foreseen to match with a "high" level 20 in the atmospheric reaction zones which would vary by about 1 foot, this "high" level being maintained by the relative adjustment of the slurry feed flow towards filter, to the combined reactant feed flows.

The slurry inlet and outlet nozzles in the flash cooler must be staggered in level, in such a way as to avoid any risk of direct short circuit flow from inlet to outlet. With a view to this requirement, the inlet lower point will be located relating to the oulet higher point at a vertical distance not smaller than one fourth of flash cooler diameter. In practice all the above combined conditions will bring the flash cooler bottom to be very close to the ceiling of the reaction compartments with which it is connected.

This low installation level has to be compared with the installation rule for free slurry fall flash coolers fed by pumping, wherein the flash cooler low point was at 16-18 feet above the same ceiling and wherein slurry pumping had to provide for a free fall of several meters inside the flash cooler.

For a conventional plant, with free slurry fall flash cooler, producing 1200 tons of $P_2O_5$ per 24 hours, a slurry circulation through the flash cooler of ratio 15/1 was used, which required 2–300 HP centrifugal pumps, total 600 HP. For an equivalent plant using the circulation arrangement of the present invention, the power needed for the same flow would drop to 50 HP. If, moreover, a circulation rate of 30/1 is used both for the general circulation and for that on the flash cooler, then the required power will be 125 HP. The respective power reductions of 600−50=550 HP and 600−125=475 HP correspond roughly to a 10% saving on the total acid production power consumption, which is an important factor of the manufacturing cost.

There must be added the still more significant saving on the rock grinding power, which is in the range of 40 to 60% of the latter. The total saving is therefore about 25% of the combined grinding and manufacturing power.

For the plant capacity of 1200 tons of $P_2O_5$ per 24 hours, the flow rates of 15/1, 20/1, 30/1, 40/1 correspond for the usual rocks and conditions, to respectively 6,000–8,000–12,000 and 16,000 $m^3$/hour. Such flows with low manometric heads can be obtained by propellers or simplified circulators arranged for instance as propellers or circulators 24 or 25 of FIG. 1, within large pipes which connect together the compartments involved. As an alternative installation, the slurry recycle from compartments n to 1 for instance can be made by a propeller or circulator 26 arranged within a siphon 27, primed by a vacuum pipe 28 connected to flash cooler 15, as shown on FIG. 3.

The use of circulators with variable flow for 24 (or 26) and for 25, installed as shown on FIG. 1 enables to advantageously select any combination of flow ratios, wherein the flow through the flash cooler is larger or at least equal to the general circulation flow, within the respective limits of 20/1–40/1 and 3/1 to 40/1 of the present invention.

It might not be required to have available a continuous flow variation, through continuous vari-speed drives for instance, being considered that flows approximately close to the optimal ones would already provide satisfactory results. In this case, additionally to the availability of a limited selection of driving speeds through V belt drives with various sets of pulleys for instance, a certain discontinuous gradation of flows can be obtained by the use of a series of circulators in parallel, a variable number of which are used according to the flow level desired.

In the alternative flow-sheet of FIG. 4, wherein the circulation through the flash cooler has a reverse direction as compared with the general circulation, the flow of circulators 25' is the sum of the total flow of circulators 24 of the general circulation, and of the flow through flash cooler 15. This alternative arrangement enables therefore to get in the flash cooler any desired flow, independently from the flow selected for the general circulation, either larger, equal or smaller than the latter.

Figure 5:
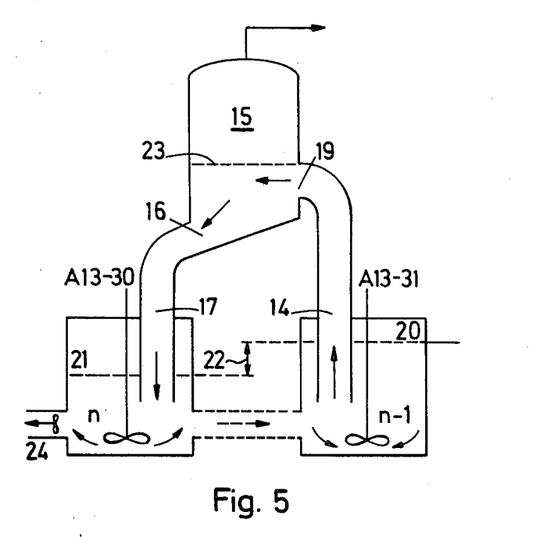
FIGS. 5 and 6 are sketches of alternative means arrangements for producing the motive head for the flow through the flash cooler.

FIG. 5 shows an alternative arrangement for the circulation through the flash cooler, wherein, compartments n and n−1, have been adequately reduced in dimensions, and the level differential 22=20−21 is produced by propeller agitators A 13-30 and A 13-31, the diameters of which are approximately equal to 70% of the diameter of the respective compartments, the agitator in the low level compartment pushing the slurry downwards, whereas that in the high level compartment pushes it upwards.

Figure 6:
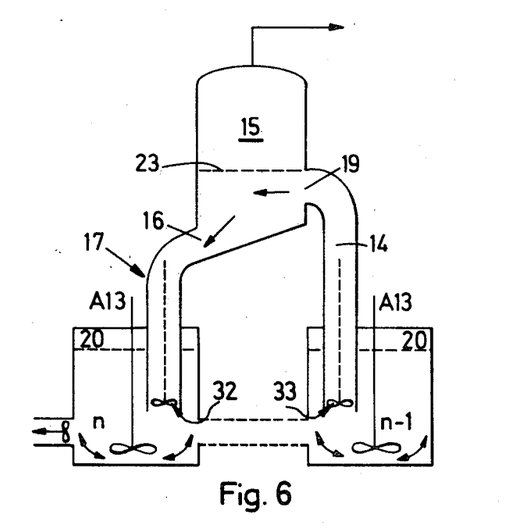

In FIG. 6, the motive head for the circulation through the flash cooler is obtained by installing, inside of either or both of the barometric pipes 14 or 17, propellers 32 and/or 33, so as to obtain the desired circulation flow.

Figure 7:
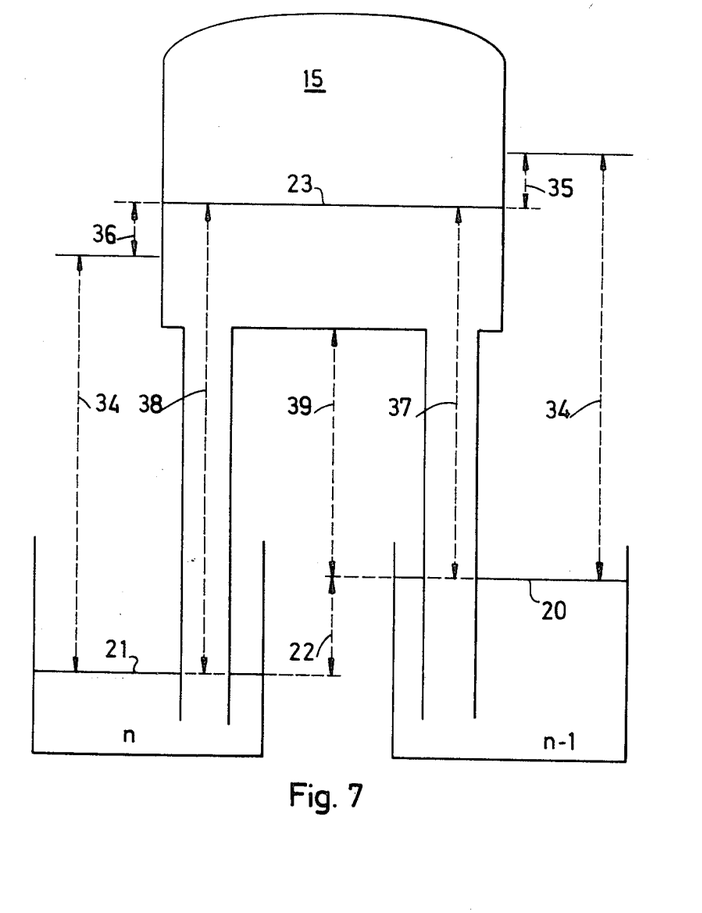
FIG. 7 is a sketch showing an example of the arrangement of the various levels, barometric columns and motive heads for a 2 feet level differential.

FIG. 7 displays a particular operating case for the circulation through flash cooler 15, in the case of two slurry levels in the reaction zones, by a motive head 22=20−21=2 feet for instance. Barometric columns 34 are shown above the respective slurry levels 20 and 21. The flow from n−1 into 15 is produced by motive head 35=1.1 foot, equal to the difference between 34 and distance 37 between levels 23 and 20. The flow from 15 into n is produced by motive head 36=0.9 foot, equal to the difference between (23−21=38) and 34, with the condition 35+36=22=2 feet.

All the above alternative arrangements will easily be applied to multitank or multicompartment reaction systems.

The arrangement according to FIG. 6 is convenient for the application of the invention to a reaction system with only one atmospheric slurry level. It will therefore be preferred when it is desired to draw the slurry flow to the flash cooler from one reaction zone and return the cooled slurry to the same zone. It will therefore preferably be used when the present invention of the three combined circulations at the chosen rates has to be grafted on a reaction system consisting of one single tank, with one sole slurry level. In this case, the three circulations, local, general and through the flash cooler shall be organized by the specific circulation patterns of the various agitators, propellers and circulators, fitted in appropriate locations in the tank or aside of it, with the help of baffles of appropriate design, the implementation of the whole system being the matter of hydraulics technical specialists.

Examples of application to various phosphate rocks with various circulating ratios.

A large scale experimentation has been made in an industrial plant suitable for application of the process enabling treatment of up to 50 tons per hour of phosphate rock and comprising a circulator for the general circulation with varispeed drive, giving any flow between 250 and 4000 m$^3$/h, together with a circulator to the flash cooler with a V-belt drive, giving a set of flows between 1500 and 6000 m$^3$/h by pulley set interchange.

The reaction zones in the slurry circuit comprised four equal compartments with a total useful volume of slurry of 360 to 380 m$^3$, together with a fifth one of small volume in which the circulator to the flash cooler was installed. Additionally, there were a certain number of maturing zones, the action of which is without the scope of the present experimentation.

In all the tests, reactants were introduced by portions into the first two compartments. The horizontal rotary vacuum cell filter was fitted with three counter-current washes and with a varispeed drive of a speed variation ratio of 1 to 6. This enabled the operator to get a stabilized operation of the plant with the filter speed adjusted at its minimum value convenient for the particular filterability of the calcium sulfate obtained, such as the cake surface just appears in each cell immediately before that the following wash liquid is poured thereupon.

For the successive runs at such stabilized conditions, the filter speeds respectively arrived at, together with the cake thickness, with which they are inversely proportional, gave therefore series of numbers which corresponded to relative measurements of the filterability of the calcium sulfate obtained (thicker cake=better filterability).

The wash water rate was adjusted according to rock and cake qualities, the latter being variable with its filterability, in such a way as to get through the cake the required quantity of water necessary to keep the product acid P$_2$O$_5$ content between 29 and 30%, the flow such determined being also that which gives an optimal cake wash.

The local circulation was 1080 m$^3$/h for each agitator (ratio 12/1 for a basic slurry flow of 90 m$^3$/h), but for the apatite rock of test number 3 hereinafter, it had to be increased to 2000 m$^3$/h (22.2/1) in the first three compartments, in connection with the relatively poor results obtained with the lower flow.

In the following tests, the corresponding higher speed for the first three agitators has therefore been used whenever the general circulation rate was decreased to or below 10/1, and the corresponding results have been labelled with the mark "HS".

Test No. 1

37 tons of North African phosphate rock with 33% P$_2$O$_5$ are treated per hour, with 32.4 tons of H$_2$SO$_4$, together with the recycled weak phosphoric acid, giving a basic slurry flow of 90 m$^3$/h. That means 4 hours or retention time in the reaction volume of 360 m$^3$.

With a general circulation and a circulation through the flash cooler both settled at 3150 m$^3$/h (35/1), the operation is stabilized as described hereinabove, with a 70 mm cake, and a total P$_2$O$_5$ content in the gypsum (CaSO$_4$-2 H$_2$O) of 0.61%.

The general circulation is then reduced to 1800 m$^3$/h (20/1), the filterability becomes poor, and filtration equilibrium can be restored by reducing cake thickness to 40 mm, the P$_2$O$_5$ content in the cake getting up to 0.82%.

The general circulation is brought back to ratio 35/1, and circulation through flash cooler is reduced to 20/1; after stabilization, cake has been reduced to 45 mm and P$_2$O$_5$ content has increased to 0.72%.

With the circulation through flash cooler brought back to 35/1, general circulation is then increased to its maximum of 4000 m$^3$/h (44.5/1), cake is stabilized at 45 mm and P$_2$O$_5$ at 0.77%.

With general circulation back to 35/1, circulation through flash cooler is increased from 35/1 to 40/1, cake remains stabilized at 70 mm, and P$_2$O$_5$ at 0.62%. Pushing then to the maximum of 6000 m$^3$/h (66/1), no further improvement can be noticed.

Test No. 2

In similar conditions, 34.5 tons per hour of Central Florida phosphate rock with 32% P$_2$O$_5$ are processed with 27,2 tons of H$_2$SO$_4$, and recycled phosphoric acid, giving the same basic flow of slurry of 90 m$^3$/h.

With 2250 m$^3$/h of general circulation (25/1) and 3150 m$^3$/h (35/1) through flash cooler, cake thickness is 80 mm, with 0.65% P$_2$O$_5$.

With 10/1 and 35/1, respectively, 55 mm and 0.85% P$_2$O$_5$ (HS);

With 25/1 and 20/1, respectively, 58 mm and 0.75% P$_2$O$_5$;

With 35/1 and 35/1, respectively, 57 mm and 0.80% P$_2$O$_5$;

With 25/1 and 40/1, respectively, 80 mm and 0.65% P$_2$O$_5$;

With 25/1 and 66/1, resectively, 80 mm and 0.64% P$_2$O$_5$;

Test No. 3

In similar conditions, 28.9 tons per hour or apatite with 39% P$_2$O$_5$ are processed with 26.5 tons of H$_2$SO$_4$ and recycle phosphoric acid giving the same basic slurry flow of 90 m$^3$/h.

With 450 m$^3$/h of general circulation (5/1) and 2250 m$^3$/h of circulation through flash cooler (25/1), cake is 55 mm with 0.70% P$_2$O$_5$. (HS)

With 2.8/1 and 25/1, respectively, 50 mm with 0.75% P$_2$O$_5$ (HS);

With 5/1 and 10/1, respectively, 40 mm with 0.85% P$_2$O$_5$ (HS);

With 15/1 and 25/1, respectively, 35 mm with 0.95% P$_2$O$_5$;

With 5/1 and 40/1, respectively, 55 mm with 0.69% P$_2$O$_5$ (HS);

With 0 and 25/1, respectively, filter has become too small (HS);

With 5/1 and 66/1, respectively, 55 mm with 69% P$_2$O$_5$ (HS);

Test No. 4

In similar conditions, 34.1 tons of North Florida phosphate rock with 30% P$_2$O$_5$ are processed with 26,5 tons of H$_2$SO$_4$ and recycle phosphoric acid, giving the same basic flow of slurry of 90 m$^3$/h With 1080 m$^3$/h (12/1) of general circulation and 2700 m$^3$/h (30/1) of circulation through flash cooler, cake is 75 mm with 0.76% P$_2$O$_5$.

With 5/1 and 30/1, respectively, 40 mm with 1.02% P$_2$O$_5$ (HS);

With 12/1 and 10/1, respectively, 45 mm with 0.95% P$_2$O$_5$;

With 35/1 and 30/1, respectively, 45 mm with 0.98% P$_2$O$_5$;

With 12/1 and 40/1, respectively, 75 mm with 0.76% P$_2$O$_5$;

With 12/1 and 66/1, respectively, 75 mm with 0.75% P$_2$O$_5$.

Case of Phosphate Rocks Ground More Finely

All the tests have been made with coarsely ground rocks, as already specified, i.e. about 60% by weight passing through "100 mesh Tyler" sieve, but the particles larger than 0.5 mm having been discarded and recycled to the grinding mill—This appears to be the fineness of grinding which is the best compromise in the present economic conditions, in as much as the prescriptions of the present invention are applied.

If a finer grind is used, such as has been generally the rule in the past, for instance 90% passing through 100 mesh Tyler sieve, a sensibly increased reactivity is obtained for the hard and little reactive rocks, whereby a higher general recirculation flow has to be chosen—but this at the cost of a high grinding power consumption.

For instance, with the same apatite as for Test No. 3, the following circulation ratios should be chosen:
general recirculation 15/1 to 25/1
circulation through flash cooler 20/1 to 30/1
agitation-rule unchanged.

The circulation ratios have been expressed in the form of fractions in the above description and specification. It is also usual to express them in percentages of the basic flow used. As an example, a circulation flow at a rate 20/1 is equal to 2000% of the basic flow (by weight or by volume are here equivalent). The descriptions and examples have displayed reaction zones working at atmospheric pressure, whereas, in the vacuum cooling zone, there is the reduced pressure corresponding to the vacuum boiling off rate desired. It is obvious, however, that the whole or part of reaction zones can be operated at a pressure other than the atmospheric pressure, remaining however higher than the reduced pressure of the vacuum cooling zone, being further understood, that arrangements are made in order to ensure the specified slurry circulations, taking into account the working pressures chosen. In this case, the name of barometric column will be kept for the height of liquid in a vertical cylinder open at its lower end, the latter being immersed in a vessel at the working pressure, whereas the upper end is closed and located at a level higher than the free surface of the liquid column therein, the upper free space in the cylinder having a gaseous phase at the same pressure as in the vacuum cooling zone, and the liquid column being in equilibrium with both said gaseous phase, and the liquid in said vessel wherein the cylinder is immersed. Within these circumstances, the said barometric column is taken with its base at the liquid level in the vessel, and its top a the upper free surface in equilibrium with said gaseous phase.

As conclusion, the scope of the invention can be summarized as follows.

It was known to produce, in a phosphoric slurry circulation, the reactions which give phosphoric acid and crystallized calcium sulfate, with a view to diluting and dispersing the reactants therein and to put at the disposal of calcium sulfate good terms on which it can preferably crystallize. But it was generally admitted and well established that slurry circulations of the order of 15/1 or 20/1 were quite appropriate, irrespective of the phosphate rock type used.

Attempts to establish, for the reactions, new bases, fundamentally different from the old ones, with a unified circulation of an inconsiderately inflated rate, have not brought any visible success.

It was not known that the circulation conditions should so be widely modified in relation with the kind and fineness of the phosphate rock used.

The invention has brought to evidence that it is necessary, for each kind of phosphate rock at a given fineness, to select an optimal combination of three circulations as precisely set out in the present specification, with a view to obtain the most favourable results, and the invention has further shown that the ranges of circulation rates, although often higher than those currently used up to now, do not, by far, have to reach the much exagerated rates proposed by the new processes with single circulation.

It should be noted that the ton-units used in the specification are metric tons.

It is claimed:

1. In the process for the manufacturer of phosphoric acid by the wet process which comprises
introducing phosphate rock, sulfuric acid and phosphoric acid as feed components into one or more reaction zones of an attack system,
reacting said rock, sulfuric acid and phosphoric acid in said attack system to produce a reaction slurry of an aqueous solution of phosphoric acid and crystallized calcium sulfate as end-products of the process, said attack system having a plurality of reaction zones and comprising a serial and cyclic flow of said slurry through at least some of said reaction zones,
agitating said slurry in each of said plurality of reaction zones, at least one of said plurality of reaction zones being in slurry flow communication with at least one vacuum cooling zone having a pressure lower than the pressure in said at least one reaction zone,
passing a flow of reaction slurry from said at least one reaction zone communicating with said vacuum cooling zone, evaporating water from said slurry in said cooling zone to cool the slurry therein,
returning the resulting cooled flow of slurry from said vacuum cooling zone to said at least one reaction zone,
withdrawing a portion of said reaction slurry from said attack system at a basic slurry flow corresponding to the total feed rate of said feed components to said attack system, separating phosphoric acid and calcium sulfate crystals from said withdrawn portion of slurry, washing said calcium sulfate crystals with water to form a diluted solution of phosphoric acid, collecting a first portion of the separated phosphoric acid and the washed calcium sulfate,
passing to said attack system, as part of said feed components, the remaining portion of said separated phosphoric acid, together with the said diluted phosphoric acid solution, the improvement comprising
maintaining the rates of said flows so that the cyclic flow rate of said slurry is between 300 and 4000% by weight of said basic slurry flow, the flow rate of said slurry passing to said vacuum cooling zone is between 2000 and 4000% of said basic slurry flow, the flow rate of the local agitation in said reaction zones being 500 and 2200% by weight of said basic slurry flow, and the sum of said local agitation flow rates and the cyclic flow rates in each of the reaction zones wherein feed components are introduced which immediately follow them in the direction of the slurry flow through the reactors being not less than 2500% of said basic slurry flow.

2. The process of claim 1, wherein said phosphate rock feed component contains 60 to 75 weight percent of grains which pass through a 100 mesh Tyler sieve.

3. The process of claim 1, wherein said phosphate rock feed component is sedimentary phosphate rock and the said cyclic flow rate and flow rate of the slurry passing to the at least one vacuum cooling zone are both between 3000% and 4000% by weight of said basic slurry flow.

4. The process of claim 3, wherein at least two reaction zones are in communication with said vacuum cooling zone but not in direct communication with each other and the cyclic flow rate is identical to the flow rate of the slurry passing to the vacuum cooling zone.

5. The process of claim 1, wherein said phosphate rock feed component is igneous apatite, the said cyclic flow rate is between 300% and 1000% by weight of said basic slurry flow and the said flow rate of the slurry passing to the at least one vacuum cooling zone is between 2000% and 3000% by weight of said basic slurry flow.

6. The process of claim 1, wherein said phosphate rock feed component is Central Floridian phosphate rock, the said cyclic flow rate is between 1500% and 3000% by weight of said basic slurry flow and the said flow rate of the slurry passing to the at least one vacuum cooling zone is between 3000% and 4000 by weight of said basic slurry flow.

7. The process of claim 6, wherein at least two reaction zones are in communication with said vacuum cooling zone but not in direct communication with each other and the cyclic flow rate is identical to the flow rate of the slurry passing to the vacuum cooling zone.

8. The process of claim 1, where at least two reaction zones are in communication with said vacuum cooling zone but not in direct communication with each other and the cyclic flow rate is identical to the flow rate of the slurry passing to the vacuum cooling zone.

9. The process of claim 1, wherein said attack system comprises at least 4 reaction zones, the attack system having dimensions to allow a slurry retention time of at least 4 hours, and the feed components are introduced to the attack system in portions within the first half of the system, commensurate with the consumption of $SO_4^{-2}$ ions by the reaction, maintaining the concentration of $SO_4^{-2}$ ions in the liquid of the slurry between 15 and 30 g/liter.

10. The process of claim 9, wherein said attack system comprises at least 6 reaction zones.

11. The process of claim 10, wherein said attack system comprises 6 to 12 reaction zones.

12. The process of claim 1, wherein the flow rate of said slurry passing to the one or more vacuum cooling zones is higher than said cyclic flow rate.

13. The process of claim 1, wherein after said withdrawing of a portion of the reaction slurry step and prior to said separating of the phosphoric acid and calcium sulfate, the withdrawn slurry is serially fed to 2 or more maturing zones, each zone having an individual local agitation flow rate of 200% to 1000% by weight of the basic slurry flow, the maturing zones having dimensions to allow a maturing time of 1 to 3 hours without recirculation of the slurry before the separating step.

14. The process of claim 1, wherein the slurry within each of said one or more vacuum cooling zones is in communication with the slurries of two reaction zones with a higher internal pressure by means of at least two barometric columns of slurry, the slurry level differential of the two reaction zones being maintained at 1 to 5 feet.

15. The process of claim 22, wherein said phosphate rock has the following composition:
$P_2O_5$: 29 to 34%
Cao: 48 to 51%
$SiO_2$: 2 to 4%
MgO: 0.2 to 0.6%
$CO_2$: 4 to 6%
and wherein
the flow of the general slurry circulation and that of the circulation through any vacuum cooling zone are at rates both comprised between 3000 to 4000% by weight of the basic slurry flow.

16. The process of claim 1, wherein said phosphate rock has the following composition:
$P_2O_5$: 37 to 40%
CaO: 50 to 53%
$SiO_2$: 2 to 6%
MgO: 0.4 to 0.6%
$CO_2$: less than 2%
and wherein
the flow of the general slurry circulation is at a rate comprised between 300 and 1000%, and the flow of the circulation through any vacuum cooling zone is at a range between 2000 and 3000% by weight of the basic slurry flow.

17. The process of claim 1, wherein said phosphate rock has the following composition:
$P_2O_5$: 30 to 33%
CaO: 45 to 47%
$SiO_2$: 7 to 11%
MgO: 0 to 0.5%
$CO_2$: 1.5 to 3.5%
and wherein
the flow of the general slurry circulation is at a rate comprised between 1500 and 3000%, and the flow of the circulation through any vacuum cooling zone is at a rate between 3000 and 4000% by weight of the basic slurry flow.

18. The process of claim 1, wherein said phosphate rock has the following composition.
$P_2O_5$: 28 to 31%
CaO: 44 to 48%
$SiO_2$: 4 to 12%
MgO: 0.5 to 1.2%
$CO_2$: 3 to 6%
and wherein
the flow of the general slurry circulation is at a rate comprised between 1000% and 2500% and the flow of circulation through any vacuum cooling zone is at a rate between 2000% and 4000% by weight of the basic slurry flow.

19. The process of claim 18, wherein at least two reaction zones are in communication with said vacuum cooling zone but not in direct communication with each other and the cyclic flow rate is identical to the flow rate of the slurry passing to the vacuum cooling zone.

20. The process of claim 1, wherein at least two reaction zones are in communication with a vacuum cooling zone, including the last two reaction zones in said cyclic flow.

21. The process of claim 1, wherein said attack system comprises at least 4 reaction zones.

22. The process of claim 1, wherein each of said reaction zones comprises an agitator.

* * * * *

UNITED STATES PATENT OFFICE
CERTIFICATE OF CORRECTION

Patent No. 4,298,583  Dated November 3, 1981

Inventor(s) Samuel V. Houghtaling and Armand L. Davister

It is certified that error appears in the above-identified patent and that said Letters Patent are hereby corrected as shown below:

On page 1, position 73 after "Assignee" delete "Davy Powergas, Inc., Lakeland, FLA" and insert--Société de Prayon, Prayon-Foret, Belgium---.

Signed and Sealed this

Twenty-third Day of November 1982

[SEAL]

Attest:

GERALD J. MOSSINGHOFF

Attesting Officer  Commissioner of Patents and Trademarks